May 12, 1953 — C. L. CALOSI — 2,638,568
MOTOR SPEED CONTROL
Filed Jan. 18, 1949 — 4 Sheets-Sheet 1

INVENTOR
CARLO L. CALOSI
BY
ATTORNEY

May 12, 1953 C. L. CALOSI 2,638,568
MOTOR SPEED CONTROL
Filed Jan. 18, 1949 4 Sheets-Sheet 2

INVENTOR
CARLO L. CALOSI
BY
ATTORNEY

INVENTOR
CARLO L. CALOSI
BY
ATTORNEY.

INVENTOR
CARLO L. CALOSI
BY
ATTORNEY

Patented May 12, 1953

2,638,568

UNITED STATES PATENT OFFICE 2,638,568

MOTOR SPEED CONTROL

Carlo L. Calosi, Cambridge, Mass., assignor to Raytheon Manufacturing Company, Newton, Mass., a corporation of Delaware Application January 18, 1949, Serial No. 71,467

32 Claims. (Cl. 318—259)

This invention relates in general to electric circuits for controlling the operation of electric motors, and more particularly to such circuits which operate direct current motors from alternating current power lines.

It is the main object of the invention to provide improved control circuit means for D. C. electric motors.

It is another object to provide such means which accurately and smoothly accelerates the motor to and maintains it at a desired constant speed within wide limits of load conditions.

It is another object to provide such means which maintains the motor speed constant up to a prescribed high load limit, and then reduces the motor speed to zero when the load exceeds this limit, and to further provide such means which can be arranged to reduce the stalled current to a safe limit when the motor speed is so reduced.

It is another object to provide such motor control means which can be arranged to provide any desired speed-torque characteristics, so that, with a single motor, the desirable characteristics of either a series, shunt, or compound-wound motor can be had.

It is a further object of the invention to provide circuit means employing gaseous discharge tubes wherein the foregoing advantages are had and the tubes are simultaneously protected from being burned out, while furnishing smooth starting current throughout an accelerating or starting period.

It is a still further object to provide circuit means for reversing and stopping the motor, wherein events are arranged in a sequence such that switch contacts in the circuit are without electric current at the moment of opening or closing, whereby relay life is greatly extended.

It is a still further object of the invention to provide braking means wherein, for reversing purposes, dynamic braking and reverse-current braking are combined to advantage.

It is still another object to provide the foregoing control circuit means wherein, in a full wave system, the currents drawn through both branches are automatically balanced in the interests of smooth operation, low heat loss, and generally improved efficiency.

Other and further objects and features of the present invention will become apparent from the detailed description of certain embodiments thereof which follows, reference being made to the accompanying drawings, wherein.

Figure 1:
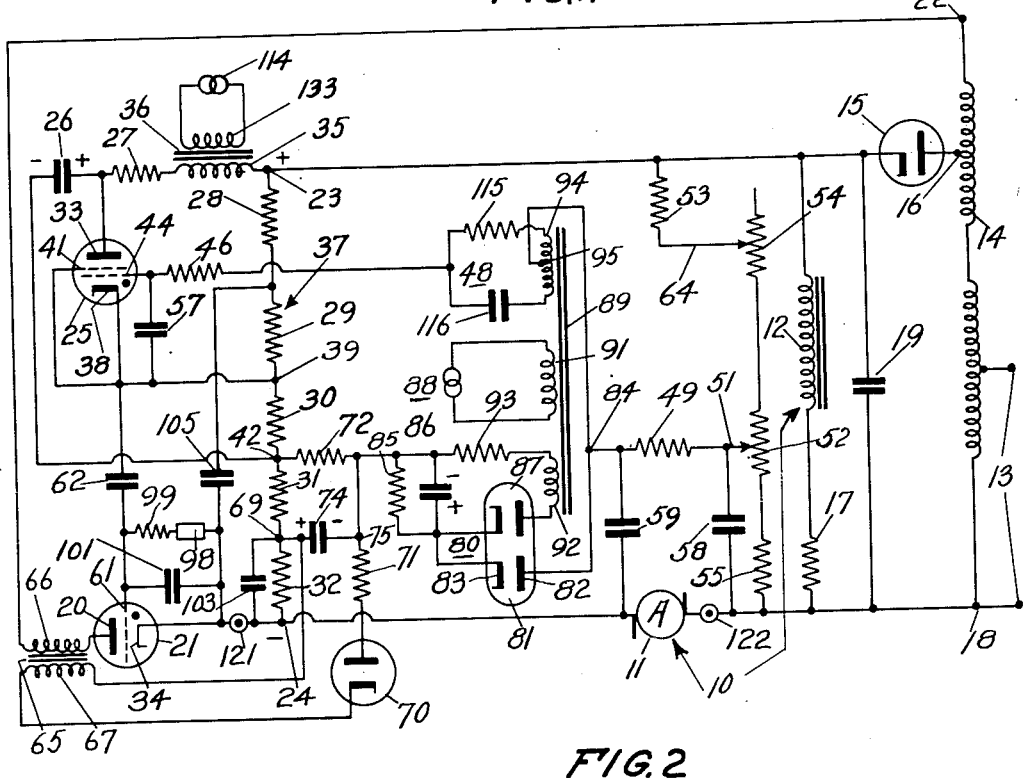
Fig. 1 is a circuit diagram of a half-wave motor control system in accordance with the invention.

Referring now to Fig. 1, a direct current motor 10 comprising an armature 11 and a field winding 12 is driven from a source of alternating current, not shown, through input terminals 13 connected to an autotransformer 14. A current rectifier 15, which may be of any desired form, provides unidirectional current for the field winding 12. This rectifier is connected at one side to the autotransformer 14 at a point 16, and at the other side to one end of the field winding 12. The field winding is connected at its other end to a resistor 17 which is connected at its remaining end to the common end 18 of the autotransformer 14. The voltage provided between the points 16 and 18 of the autotransformer is higher than that of the source, as desired. A condenser 19 is connected in parallel with the field winding 12 and resistor 17 to stabilize the unidirectional field voltage at a high value, very close to the peak alternating voltage between the points 16 and 18 of the autotransformer 14. A main grid controlled gaseous discharge tube 21, which may be a thyratron, is connected at its anode 20 to the remaining end 22 of the autotransformer 14, and at its cathode 24 to one side of the armature 11, which is, in turn, connected at its other side to the common point 18. Unidirectional current pulses are thereby provided to the armature 11 from the autotransformer 14, at the highest voltage available therefrom. The gaseous discharge tube 21 is controlled in its firing by circuit means which will now be described.

An auxiliary gaseous discharge tube 25 is arranged in a relaxation oscillator circuit including a charging condenser 26 and a charging resistor 27. A voltage divider 37, including resistors 28, 29, 30, 31 and 32 in series, is connected across the field voltage supply between points 23 and 24 from the positive to the negative side, respectively. The armature 11 is interposed between the negative point 24 and the negative end 18 of the voltage supply. The anode 33 of the auxiliary gaseous discharge tube 25 is connected to the positive point 23 through the charging resistor 27 and the secondary winding 35, of a transformer 36, in series. The primary winding 113 of this transformer is connected to a source of alternating voltage, represented by a generator 114, which is of the same phase and frequency as the main power alternating voltage applied at the main power terminals 13. The purpose of the transformer 36 will be explained below. The cathode 38 and the screen grid 41 of this tube are connected together to an intermediate point 39 of the voltage divider 37. The charging capacitor 26 is connected at one side to the anode 33, and at the other side to another intermediate point 42 on the voltage divider 37 closer to the negative end 24 thereof than the first-mentioned intermediate point 39. The voltage existing between points 23 and 39 of the voltage divider energizes the anode-cathode path of the auxiliary discharge tube 25, while the voltage between points 23 and 42 is employed to charge the condenser 26 through the charging resistor 27.

The control grid 44 of the auxiliary discharge tube 25 is connected, via a current-limiting resistor 46, a phase-shifting network 48, and a second or coupling resistor 49, to the movable or "reference voltage" tap 51 of a potentiometer 52, which serves to control the D. C. level or "reference voltage" of the control grid 44 with respect to the cathode 38. The phase-shift network 48 is provided with alternating current from a source, represented by a generator 88, of the same frequency and phase as the main power source which is connected to the main power terminals 13. A transformer 89 has its primary winding 91 connected to this source and a secondary winding 94 connected in the phase-shift circuit. This secondary winding 94 is connected at a center point 95 to the coupling resistor 49 and therethrough to the reference voltage tap 51. A capacitor 116 and a resistor 115 are connected in series across the secondary winding 94, and their common junction is connected to the control grid 44 via the limiting resistor 46. The capacitor and resistor are dimensioned to provide that the alternating voltage on the control grid 44 shall lag the main power alternating voltage, and, therefore, alternating voltages which exist at the anodes 20 and 33 of the two discharge tubes by ninety degrees in phase, as will be discussed more fully below in connection with Fig. 3. The potentiometer 52 is in a second voltage divider circuit connected across the field voltage supply, and including in series a fixed resistor 53, a second potentiometer 54, the first-mentioned potentiometer and another fixed resistor 55. Bypass capacitors 58 and 59 are connected from each side of the coupling resistor 49 to the common terminal 13 and the positive side of the armature, respectively. A bypass capacitor 57 is connected between the control grid 44 and the cathode 38.

The cathode 38 is connected to the control grid 61 of the main gaseous discharge tube 21 via a coupling capacitor 62. In normal operation, the relaxation oscillator circuit of the auxiliary gaseous discharge tube 25 furnishes extremely sharp voltage pulses at the cathode 38, which are coupled through the coupling capacitor 62 to the control grid 61 of the main gaseous discharge tube 21, which is thereby fired at an accurately controlled point in its conductive half-cycle to operate the motor 10 at a desired speed which is controlled by the setting of the movable arm 51 of the potentiometer 52. The precise manner in which this is accomplished is explained in detail below in connection with Figs. 2 and 3. The movable arm 64 of the second potentiometer 54 adjusts the maximum speed which can be obtained with settings of the reference voltage tap 51 of the first potentiometer 52.

The control grid 61 of the main gaseous discharge tube 21 may be provided with an initial fixed bias by means of a bias source 98 which provides a potential to the control grid 61 which is negative with respect to the potential level of the cathode, through a current-limiting resistor 99. The bias circuit is by-passed by a capacitor 101. The bias potential source may be of any suitable type, such as, for example, a battery, or a circuit of a kind to be described in connection with Fig. 7 may be used, if desired. A filter capacitor 103 is provided in parallel with the resistor 32 nearest the negative end 24 of the voltage divider. A bypass capacitor 105 is provided across the entire voltage divider with the exception of the first resistor 28 nearest the positive end 23 thereof.

Figure 2:
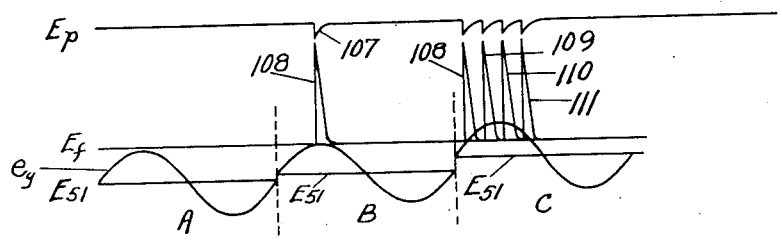
Fig. 2 is a wave diagram illustrating the operation of the circuit of Fig. 1 under one set of operating conditions.
Figure 3:
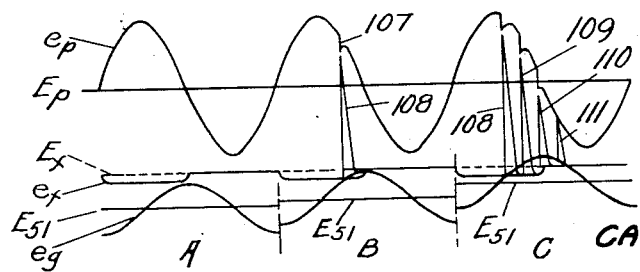
Fig. 3 is a wave diagram illustrating the operation of the circuit of Fig. 1 under a second set of operating conditions.

The operation of the relaxation oscillator circuit of the auxiliary gaseous discharge tube 25 may be better understood from Figs. 2 and 3. Fig. 2 illustrates the operating conditions of the relaxation oscillator circuit when the voltage $E_p$ applied to the anode 33 is unidirectional. This voltage is derived directly from the autotransformer 14 at point 16 via the rectifier 15 and the filter capacitor 19, and is fairly steady. With a steady unidirectional voltage at the anode 33, and assuming the cathode 38 also to be at a steady unidirectional potential, namely, that of intermediate point 39 on the voltage divider 37, there will exist a firing potential of a prescribed value represented by the line $E_f$. The potential of the control grid 44 is made up of two components, one of which is a unidirectional reference voltage $E_{51}$, namely, the voltage at the movable tap 51 of the speed control potentiometer 52, and is adjustable in level with respect to $E_f$ and $E_p$, and the other of which is an alternating voltage $e_g$ furnished via the transformer 89 through the phase-shift network 48. In Fig. 2 there are illustrated three different operating conditions, designated A, B and C, respectively. In condition A, $E_{51}$ is set so far below $E_f$ that $e_g$ at no time reaches as high as $E_f$. With this setting, the auxiliary gaseous discharge tube 25 is not fired, and the motor 10 is at rest. In condition B, $E_{51}$ is raised in a positive direction, toward $E_p$, to the point where $e_g$ just touches $E_f$ at the peak of the positive half cycle. At this instant, the charging capacitor 26, which has already been charged from the field D. C. voltage source, discharges through the tube 25 almost instantaneously, resistor 30 of the voltage divider 37 being the only appreciable resistance in the discharge circuit, thereby creating a great surge of current in the tube and driving the potential of the cathode 38 in the positive direction. At the same time, current is drawn through the anode circuit resistor 27, thereby changing the anode potential in a negative direction, and through resistors 30, 31 and 32 in the cathode circuit, thereby changing the cathode potential in a positive direction, the effect of which is to extinguish the tube and cut off the current flow after a very short period of time. The capacitor 26 may have a value of 0.005 microfarad, and the resistor 27 a value of 1 megohm, while resistors 30 to 32 together may be of the order of 100,000 ohms. These values will provide a short pulse through the tube when the capacitor 26 is discharged, and a substantial delay in the recharging of the capacitor through the charging resistor 27. At the time that the auxiliary gaseous discharge tube 25 is rendered conductive, the anode voltage $E_p$ undergoes a surge in a negative direction and recovers exponentially as the capacitor 26 is charged through the resistor 27, as shown at 107.

The change in the potential of the cathode 38 is in the form of a very sharp positive pulse, having the nature of a sharp spike 108, as shown in Fig. 2. This spike-like pulse is coupled to the grid 61 of the main gaseous discharge tube 21 by way of the coupling capacitor 62 only, and, since the coupled pulse has an extremely sharp, almost perfectly vertical leading edge, the main tube 21 is rendered conductive at a definite and sharply prescribed point in its conductive half cycle. To this end, the source 88 is in the same phase as the alternating voltage applied at the power terminals 13, and may, indeed, be the same source, while the phase-shift network 48 provides a 90 degree phase shift of the alternating voltage $e_g$ with respect thereto. The nature of this phase shift will be more fully explained in connection with Fig. 3.

Condition C in Fig. 2 represents an operation condition wherein $E_{51}$ is made sufficiently positive so that the auxiliary gaseous discharge tube 25 is rendered conductive early in the positive half cycle of $e_g$. Under this condition, a first spike 108 is produced followed by successive spikes 109, 110 and 111, all occurring during the same positive half cycle of $e_g$. The successive spikes are spaced apart by a time interval determined by the time required to charge the capacitor 26 through the resistor 27 to a firing anode potential. However, only the first spike 108 is important in the control of the main gaseous discharge tube 21 for, once this tube is fired in a conducting half cycle, it remains conductive for the remainder of that half cycle.

Fig. 3 illustrates the operation of the relaxation oscillator circuit of the auxiliary gaseous discharge tube 25 when an alternating voltage $e_p$ is superimposed upon $E_p$ by means of the transformer 36 which has its secondary winding 35 connected in the circuit of the anode 33. The primary winding 113 of this transformer is energized from a source of alternating voltage, which source is represented as a generator 114, but has the same frequency and is in the same phase as the source which is connected to the terminals 13 and may, indeed, be the same source. Thus, the alternating voltage on the anode 33 of the auxiliary gaseous discharge tube 25 is in phase with the alternating voltage on the anode 20 of the main gaseous discharge tube 21. The alternating voltage $e_g$ is retarded 90 degrees with respect to $e_p$ by the phase-shift network 48. Since there is now alternating voltage on the anode 33, the firing voltage $e_f$ is curved in a manner which is characteristic of gaseous discharge tubes operated in this manner.

In condition A in Fig. 3, $E_{51}$ is so highly negative with respect to the level $E_f$ that $e_g$ does not, at any time, become more positive than $e_f$. In condition B in Fig. 3, $E_{51}$ is rendered more positive so that $e_g$ breaks through $e_f$ at a point late in the positive half cycle of $e_p$, and the spike 108 results. The main gaseous discharge tube 21 is then rendered conductive by this spike for a similar portion of the conductive half cycle thereof as that portion of the conductive half cycle of $e_p$ during which the auxiliary discharge tube 25 is conductive. In condition C in Fig. 3, $E_{51}$ has been rendered sufficiently positive so that $e_g$ breaks through $e_f$ much earlier than the positive half cycle of $e_p$, and the spike 108 results earlier in this conductive half cycle. The main gaseous discharge tube 21 is again rendered conductive at a similar early point in its conductive half cycle. Although the succeeding spikes of the relaxation oscillator circuits are of no effect in the operation of the motor 10, it is interesting to note that, when the relaxation oscillator is operated as shown in Fig. 3, these succeeding pulses are of successive diminishing magnitudes for the reason that $e_p$ becomes more negative for each one.

The advantages of operating the relaxation oscillator as shown in Fig. 3 are that a small unidirectional anode voltage $E_p$ may be employed, thereby minimizing rectifier power source insulation and cost, while, at the same time, high voltages may be obtained at the anode 33 at exactly the time when desired, so that the spike 108 which is used to fire the main gaseous discharge tube 21 will be of an increased magnitude corresponding with the sinusoidal variations in magnitude of the anode potential of the main gaseous discharge tube 21; that is, a spike 108 which is available to fire the main gaseous discharge tube 21 during the conductive half cycle thereof is large in magnitude, whereas spikes which occur beyond either end of the conductive half cycle are of smaller magnitude. This guarantees positive firing by the spike 108 at all times.

Suitable values for the various components of the relaxation oscillator circuit are as follows:

| | |
|---|---|
| Resistor 46 _____ohms__ | 56,000 |
| Capacitor 57 _____microfarad__ | 0.003 |
| Resistors 28 and 29 combined megohms__ | 2 |
| Resistor 30 _____ohms__ | 100,000 |
| Resistors 31 and 32 combined ____do____ | 10,000 |
| $E_p$ _____volts D. C__ | 300 |
| $e_p$ _____volts A. C__ | 100 |

The tube 25 may be a type 2D21.

Suitable values of the capacitor 26 and resistor 27 have already been set forth above.

In the phase-shift network 48—

| | |
|---|---|
| Resistor 115 _____ohms__ | 270,000 |
| Capacitor 116 _____microfarad__ | 0.01 |

The foregoing suitable values are understood to be exemplary only, and in no sense to be regarded as limiting.

The speed at which the armature 11 turns is automatically maintained stable within certain prescribed limits by virtue of the fact that the back E. M. F. of the motor 10 provides a bias on the cathode 34 of the main discharge tube 21 which tends to limit the current passing through the tube as the speed of the motor increases, and to increase the current passing through the tube as the speed of the motor decreases. This is a coarse speed regulation. Fine speed regulation is afforded by means of a circuit including a transformer 65, having its primary winding 66 connected between the anode 20 of the main gaseous discharge tube 21 and the high voltage terminal 22 of the autotransformer 14. The secondary winding 67 of the transformer 65 is connected at one end to the junction point 69 of the two resistors 31 and 32 of the first voltage divider 37 which are nearest the negative end 24 thereof, and at the other end to the intermediate point 42 to which the relaxation oscillator charging capacitor 26 is connected, via a rectifier 70 and two resistors 71 and 72 in series. A capacitor 74 is connected at one side to the above-mentioned junction point 69, and at the other side to the junction point 75 between the two series resistors 71 and 72. The rectifier 70, which may be a diode electron valve, is poled to provide a voltage drop in the three resistors 31, 72 and 71 across the secondary winding 67 such that the drop in the resistor 31 of the voltage divider 37 is in opposition to the normal voltage drop present therein by virtue of the field voltage supply across the field circuit capacitor 19. This voltage drop tends to charge the capacitor 74 positively at junction point 69 and negatively at junction point 75, and the capacitor aids in providing a steady D. C. potential in the resistor 31, which is negative at the upper or normally positive end 42 thereof and relatively positive at the lower or normally negative end thereof, whereas the drop in this resistor due to the field voltage has the opposite polarity. The voltage in the resistor 31 derived through the fine speed regulation transformer 65 is called the fine speed regulation voltage and varies in magnitude in proportion to the current flowing through the anode-cathode path of the main gaseous discharge tube 21.

The effect of the fine speed regulation voltage is to make the voltage applied to the cathode 38 of the auxiliary gaseous discharge tube 25 increasingly negative with respect to the anode voltage of that tube, so that, for a prescribed setting of the potentiometer arm 51, the auxiliary discharge tube 25 will fire earlier in the charging cycle of the charging capacitor 26 with increasing current flow through the main discharge tube 21, and thereby produce a control pulse at the grid 61 of the main gaseous discharge tube 21 earlier in the conductive half cycle thereof when the current through the main discharge tube is increasing. Thus, when the motor 10 slows down, the coarse speed regulation effect automatically biases the main gaseous discharge tube 21 at its cathode 34 to fire earlier in its conductive half cycle, and the fine speed regulation effect further biases the same tube at its grid 61, this time through the speed control system, to fire still a little more early in the conductive half cycle. Even more simply, the increase of current flow through the main gaseous discharge tube 21, that results when the cathode bias is changed, due to a drop in the back E. M. F. of the motor, engenders still another increase in the same current flow in proportion to the then existing total current flow, thereby affording operation in the nature of a vernier speed regulation tending to maintain the motor speed constant within very narrow limits.

The main discharge tube 21, the armature 11, and also the load or machine which may be driven by the motor 10 are protected from damage caused by overload conditions by means of a limiter circuit generally designated by the reference numeral 80. The tube 21 and the armature 11 are protected by this circuit from excessive currents, while the driven load or machine is protected from injuries which might result if the torque should reach a dangerous value in the event that the machine should happen to jam. The limiter circuit 80 consists essentially of a diode section 81, having an anode 82 connected to the junction 84 of the resistor 49 and the phase-shift circuit 48, and a cathode 83 which is connected to the negative end 24 of the first voltage divider 37, via resistors 72, 31 and 32 in series. The cathode 83 of the limiter is thus connected in common with the cathode 34 of the main gaseous discharge tube 21 to the high voltage side of the armature 11, and its potential is accordingly coarsely regulated by the back E. M. F. of the motor 10, with respect to the potential of the anode 82. The fine regulation afforded by the voltage drop across resistor 31 derived via the transformer 65 in the anode circuit of the main gaseous discharge tube 21 is superimposed upon the coarse regulation in the manner described above in connection with the auxiliary gaseous discharge tube 25 and applied to the cathode 83 of the limiter 80, the voltage drop across resistor 72 being, in this case however, included in series with that across resistor 31.

An additional bias, opposite in sense to that of the fine regulation and in series therewith, is applied to the cathode 83 by means of a resistor 85 and a capacitor 86 in parallel connected between resistor 72 and the cathode 83. The capacitor 86 is charged with the side connected to the cathode 83 positive by way of a second diode section 87 from an alternating current source, illustrated as the generator 88, through the transformer 89. This transformer has a secondary winding 92 which is connected at one side to the anode of the second diode section 87 and at the other side to the negative side of the capacitor 86 via a charging resistor 93. The transformer 89 is representative of any suitable means of applying alternating current to both the phase-shift circuit 48 and the bias-producing circuit of the second diode section 87. Those skilled in the art to which this invention relates will recognize that separate transformers could be used, if desired.

When the motor 10 is started from a rest condition, the back E. M. F. across the armature 11 is zero volts, so that the potential of the negative end 24 of the first-mentioned voltage divider 37 is practically the same as that of the common terminal 18 of the autotransformer 14. The potential of the cathode 83 of the limiter 80 is then the algebraic sum of the drops across each of the resistors 32, 31, 72 and 85 in series. The anode 82 of the limiter will have a potential depending upon the setting of the reference voltage tap 51 of the speed control potentiometer 52. The voltage drop in the lowermost resistor 32 of the voltage divider 37 is fixed, while that in each of resistors 31 and 72 will be large and in opposition thereto by virtue of the fact that a large current will be flowing in the primary winding 66 of the fine speed regulation transformer 65, since the cathode of the main gaseous discharge tube 21 is at its lowest possible potential level. The voltage drop across resistor 85 is likewise fixed. Under these conditions, the cathode 83 of the limiter will assume the most negative value possible. Should the reference voltage tap 51 of the speed controlling potentiometer 52 be set for a sufficiently high reference voltage value to cause damage to the main discharge tube 21 or to the armature 11 or to a stalled load or machine connected to the motor 10, the limiter diode section 81 will reduce the reference voltage at point 84 to a safe value, since the diode section 81 is inherently of such a nature that a discharge thereacross occurs when the voltage at this point 84 exceeds a prescribed value above the potential of the cathode 83. During such discharge, the resistor 49 between point 84 and the reference voltage tap 51 limits current flow and causes a voltage drop due to the current that flows. With properly adjusted bias, particularly that afforded by the capacitor 86 and resistor 85 in parallel, the starting current is limited by the limiter circuit 80 so that the main gaseous discharge tube 21 is not burned out, nor is the armature 11 overheated, nor will a stalled machine or the work in it be damaged.

As the armature 11 picks up speed, the back E. M. F. of the motor 10 is applied to the negative end 24 of the voltage divider, raising the potential level of point 24 in a positive direction above the common terminal 18 of the autotransformer 14. This has the effect of raising the potential of the cathode 33 of the limiter toward the potential of the reference voltage tap 51 of the speed control potentiometer 52. Simultaneously, the current in the primary winding 66 of the fine speed regulation transformer 65 is reduced and the bias afforded by the resistors 31 and 72 in series is reduced in proportion. This is the reverse of the vernier action discussed above in connection with slowing down of the motor 10, and has the effect of a vernier regulation, in a positive direction, of the potential at the cathode 83 of the limiter 80. The anode 82 of the limiter must now reach a greater positive potential level before the limiter diode 81 breaks down. Thus, the potential at point 83, and accordingly the bias of the control grid 44 of the auxiliary gaseous discharge tube 25, is raised as the motor picks up speed. As will be pointed out below, this operation can be arranged so that the current through the armature 11 is maintained substantially constant, or provided with a characteristic which varies with motor speed in any desired manner. The limiter circuit, therefore, provides that the entire system shall be protected against overloads and starting current surges, with the additional feature, however, that the maximum safe current shall be available at all operating speeds, for the cathode 83 is elevated in potential toward the potential level at which the reference voltage tap 51 is set, as the motor 10 picks up speed. The limiter circuit 80 may be termed a "bootstrap limiter."

The limiter circuit 80 has another valuable feature in that, when the load on the motor 10 is increased, causing the armature 11 to slow down, so that the current that passes therethrough begins to rise, it will not only limit the maximum current that will be made available to the armature 11 through the main gaseous discharge tube 21, but, if the load becomes too large so that the speed of the motor cannot remain constant, the speed will drop to zero. The reason for this is that, as the armature slows down, the potential of the cathode 83 of the limiter diode 81 is changed in the negative direction toward the value of the common terminal 18, correspondingly reducing the potential of point 84 and with it the potential of the control grid 44 of the auxiliary gaseous discharge tube 25. When the motor stops, this potential reaches a limit value. This value can be adjusted so that the current flowing through the armature 11 is not sufficient to maintain the motor 10 in operation against a load greater than that at which constant speed is possible. As the armature 11 under an overload slows down below such a speed, the negative bias afforded at the cathode 83 of the limiter by the coarse and fine regulations together becomes so great that the reference voltage at point 84 becomes too low to maintain the motor in operation. In this connection, it should be borne in mind that resistor 72 affords a fine speed regulation bias to the cathode 83 of the limiter diode 81 above, and in addition to that afforded by resistor 31, which additional bias is not available to the cathode 39 of the auxiliary gaseous discharge tube 25. In this condition, the armature 11 remains stalled with a limited current flowing though it. If this limited current should be excessive for the armature and not for the main gaseous discharge tube 21, thermal overload relay means may be provided to open the armature circuit within a safe period of time.

The limiter 80 may be employed in such a manner as to provide the characteristics of a series, shunt, or compound-wound motor. The circuit conditions that will bring about each of these characteristics will be best understood in connection with Fig. 4. In this figure, curve B represents the compound-wound characteristic, wherein, for motor speeds between very close to zero revolutions per minute up to almost 2,000 revolutions per minute, the armature current is substantially constant at 2.3 amperes. To obtain this characteristic, resistors 28 and 29 of the first voltage divider 37 and the coupling resistor 49 connected between the reference voltage tap 51 and the limiter anode 82 may each have a value of 1 megohm in the circuit of Fig. 1.

Figure 4:
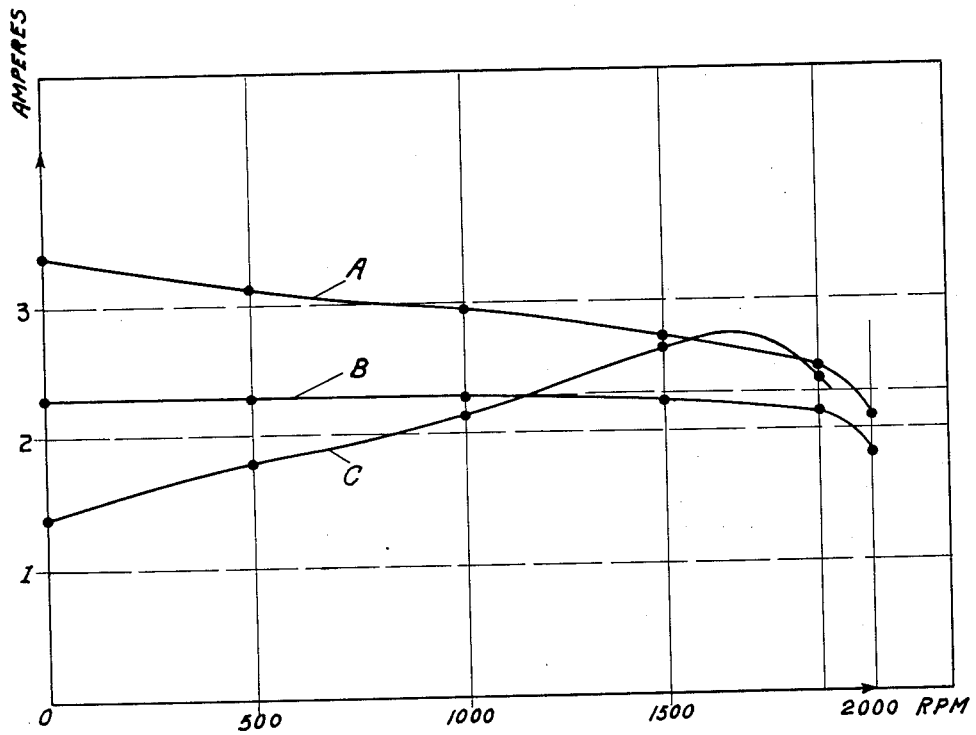
Fig. 4 is a graph illustrating motor speed vs. torque operating characteristics of Fig. 1.

Curve A of Fig. 4 illustrates the series wound characteristic, wherein high starting current, of the order of 3.4 amperes, is employed to provide high starting torque, and the running current has a lower value of the order of 2.75 amperes. This characteristic is valuable when the load or machine that will be driven by the motor 10 is of a type that does not jam and cause stalling, but is, nevertheless, sufficiently massive to require greater torque upon starting than for normal running. The series wound characteristic can be obtained by adjusting resistors 28 and 29 to 0.5 megohm each and resistor 49 to 0.33 megohm.

Curve C in Fig. 4 represents the characteristic that is desired when the load or machine that will be driven by the motor is of a type which does not require large starting torque, but is apt to jam during normal operation, and stall the motor more frequently than is ordinarily the case. Accordingly, the stalled current is less than ½ ampere through the armature, while the normal running current is as high as 2.75 amperes. This characteristic can be arrived at by adjusting resistors 28 and 29 to be 0.5 megohm each, and adjusting resistor 49 to be 1 megohm. With this characteristic, the motor will attempt to drive through a jammed load, but, if this proves to be too difficult and the motor slows down, the motor current will gradually fall to a safe value which cannot burn out the armature 11 or damage the main discharge tube 21, so that thermal overload relays which may be provided will not trip. When a machine so equipped stalls the motor 10, it is necessary only that the operator take steps to clear the jam and the machine will immediately reassume a normal operating condition.

It should be understood that the resistor values set forth in connection with Fig. 4 are exemplary only, and that a wide variety of torque vs. load characteristics may be obtained by designing the circuit to have the desired limiter characteristics with respect to motor speed.

Figure 5:
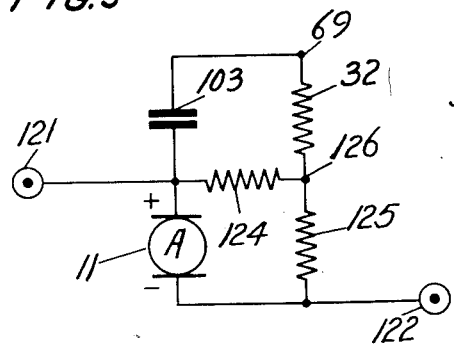
Fig. 5 illustrates a modification of Fig. 1.

Referring now to Fig. 5, the circuit of the voltage divider 37 may be modified to the extent that the negative end 24 thereof is provided with a voltage which is a fraction of rather than the total back E. M. F. of the motor 10. A voltage divider comprising two resistors 124 and 125 in series is connected across the armature 11. The negative end resistor 32 of the voltage divider 37 is connected, at the end which is at point 24 in Fig. 1, to the junction point 126 of these two resistors. With the exception of these changes, Fig. 1 is unaltered. These changes are made between two points 121 and 122 in Fig. 1. The back E. M. F. which appears across the armature 11 when the motor 10 is running appears also across the two resistors 124 and 125 in series. The portion of the back E. M. F. that appears across resistor 125 is connected at point 126 to the voltage divider 37, so that point 126 in Fig. 5 takes the place of the negative end 24 in Fig. 1. The result of this change is to permit coarse regulation of a high voltage motor with a control circuit designed for use with a lower voltage motor. Thus, if the circuit of Fig. 1 is designed for use with a 220 volt motor, a 330 or 440 volt motor may be controlled with it by making the change set forth in Fig. 5 and suitably adjusting the values of the two resistors 124 and 125 connected across the armature 11.

Figure 6:
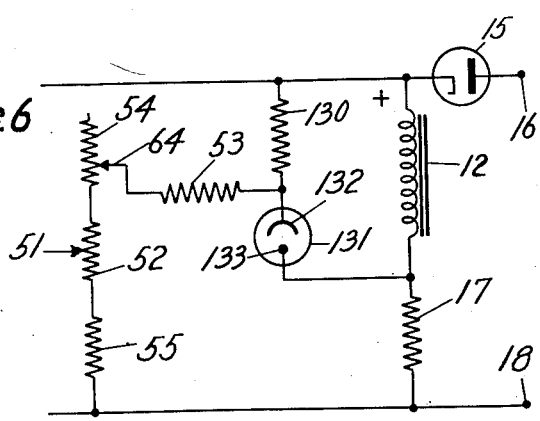
Fig. 6 illustrates another modification of Fig. 1.

The circuit of Fig. 1 may be further improved by the inclusion therein of a voltage regulator tube 131 as shown in Fig. 6. The tube may be connected across the field winding 12 in series with a resistor 130, the cathode 133 thereof being connected to the negative end of the field winding and the anode 132 being connected to the positive end of the field winding through a resistor 130. The resistor 53 of Fig. 1 which connects the speed control potentiometer 52 to the positive side of the field voltage is, in Fig. 6, connected to the anode of the voltage regulator tube 121. No other change is necessary in the circuit of Fig. 1 in order that the voltage regulator features of Fig. 6 may be incorporated therein.

The voltage regulator tube 131 may be of the VR-150 type when a field voltage of about 200 volts D. C. or more is employed. The field voltage is then a value which is always a constant, 150 volts, plus an increment which is proportional to line voltage. Thus, a large change in line voltage results only in a proportional change in a small incremental voltage of the order of 50 volts, so that the total field voltage change is comparatively small. Where the field is operated near saturation as is commonly the case in efficiently operated electric motors, this provision results in more nearly stable operation with line voltage changes. Since the voltage regulator tube 131 governs also the voltage that appears across the speed control potentiometer resistor 52, the speed control reference voltage which is set by the movable tap 51 thereof is similarly stabilized, thereby effecting corresponding stabilization of the current through the armature 11 with changing line voltage conditions. The value of the field winding series resistor 17 can be adjusted so that, with a prescribed change in line voltage, for example, 10 per cent, the change in motor speed will be so small as to be immeasurable, but as will be explained below, this resistor is preferably so adjusted that, with a 10 per cent change in line voltage, there is no more than a 2 per cent change in motor speed.

The voltage regulator circuit of Fig. 6 reduces the magnitude of changes in the motor speed with changes in the temperature of the motor as well as with changes in the field voltage, when the field series resistor 17 is suitably adjusted in magnitude. When the motor temperature increases, the resistance of the field winding 12 also increases. This tends to lower the field current, which, by reducing the back E. M. F., would normally cause the speed of the motor 10 to increase. As a result of the increased resistance of the field winding 12, the voltage at the negative end thereof becomes more negative, approaching more closely the value of the common negative terminal 18 of the circuit. This correspondingly reduces the voltage of the cathode 133 of the voltage regulator tube 131, and lowers the total applied voltage between the movable arm 64 of the maximum speed setting potentiometer 54 and the common negative terminal 18. As a result, the reference voltage at the speed control potentiometer movable tap 51 is made less positive with respect to the common negative terminal 18, so that through the control circuits, as explained above, the armature current is reduced, tending to reduce the speed of the motor. Thus, the motor speed, instead of increasing as a result of increased resistance in the field coil 12, is stabilized. The value of the series field resistor 17 can be adjusted so that, with a 10 per cent change in the motor temperature, there is an immeasurably small change in motor speed. However, as a compromise, it is preferable to adjust the magnitude of this resistor to such a point that, with a 10 per cent change in either the temperature of the motor or the line voltage, the speed of the motor remains constant within 2 per cent.

Figure 7:
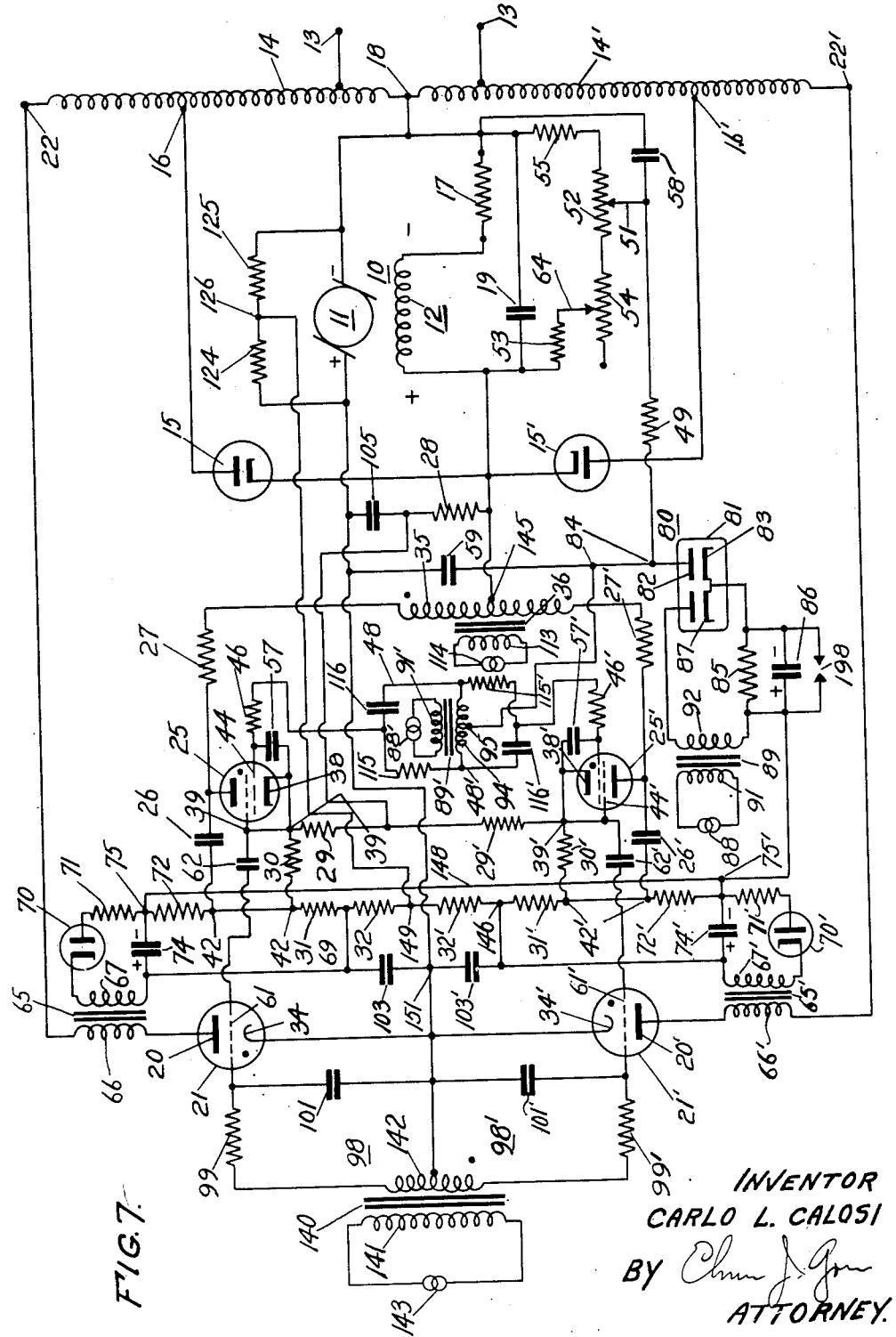
Fig. 7 is a circuit diagram of a full wave system in accordance with the invention, employing features shown in Fig. 1.

Fig. 7 illustrates the invention embodied in a full wave circuit. The various elements and features of Figs. 1 and 5 are reproduced in Fig. 7, once for each half cycle where necessary, while those elements and features which are common to both half cycles occur only once. Like parts have like reference characters in Figs. 1, 5 and 7, with the exception that where a part occurs once for each half wave it is provided, for one-half cycle, with the same reference character as in Fig. 1 and, for the other half cycle, with the same reference character primed. The bias 98 of the main discharge tube 21 of one-half cycle and the bias 98' of the corresponding main discharge tube 21' for the alternate half cycle are provided by means of a transformer 140, having its secondary winding 142 connected at each end to one of the control grids 61, 61', respectively, and at its center to the positive side of the armature 11. The primary winding 141 of this bias transformer is energized from a source of alternating current, represented by a generator 143, which may be the same source as is applied to the main input terminals 13, and is of the same frequency and phase as the main power source. The main power transformer, namely, the autotransformer, is represented as having two parts 14 and 14' joined at the common point 18 of each to provide a center tap at that point in the circuit. When the upper end 22 of the autotransformer 14, 14' is positive, the lower end of the secondary winding 142 of the bias transformer 140 furnishing bias 98' is also positive, so that a bias is provided on the control grids 61 and 61' of the main discharge tubes 21 and 21', respectively, which bias is always such as to prevent conduction through the respective tubes. Control of the firing of the main discharge tubes 21, 21' is the function of the auxiliary discharge tubes 25, 25' as has been explained above. The main power input terminals 13 are connected one to each autotransformer section 14, 14' at equal distances from the center tap or common point 18.

The phase shift circuits 48, 48' are both provided with alternating current from the secondary winding 94, shown in Fig. 7 as part of a separate transformer 89', having a primary winding 91' connected to a source of alternating current, which is conveniently represented as a generator 88', furnishing current of like phase and frequency as the main power source. The phase-shift circuits 48, 48' are connected in parallel to the secondary winding 94 in the proper manner to furnish properly phase-shifted alternating control voltages to the control grids of the auxiliary gaseous discharge tubes 25, 25', respectively, in the manner illustrated in Fig. 3. The secondary winding 35 of the transformer 36 which supplies alternating voltage to the anodes of the auxiliary discharge tubes 25, 25' is center tapped, with the center tap 145 connected to the positive side of the field voltage source, and has its upper end, namely, that connected to auxiliary tube 25, positive when the upper end of the autotransformer 14, 14' is positive.

The junction point 75 between resistors 71 and 72 and the junction point 75' between resistors 71' and 72' are connected together by means of a conductor 148. This connection provides a closed circuit consisting of resistors 72', 31', 32', 32, 31 and 72, which is connected at the junction point 149 between resistors 32 and 32' to the common terminal 18 of the circuit by way of resistor 125 of the armature shunt voltage divider. Junction point 149 will be recognized as corresponding to the negative end 24 of the voltage divider 37 of Fig. 1, and its connection in the circuit is in accordance with Fig. 5, but may be as in Fig. 1, if desired.

In operation, it is desired that the main discharge tubes 21 and 21' shall draw substantially equal currents during alternate half cycles. The resistors on either side of junction point 149 are so chosen that the currents through the two main discharge tubes 20, 21' are substantially equal. Normally, this requires that the total resistances on either side of this point 149 shall be equal. However, should one of the main discharge tubes, for example, 21, draw more current than the other, 21', the junction point 69 between resistors 31 and 32 will become more positive than the junction point 146 between resistors 31' and 32', for the reason that the voltage drop across resistors 72 and 31 in series becomes greater than the voltage drop across resistors 72' and 31' in series, it being remembered that points 75 and 75' are connected together. Under this condition, electrons flow from point 146 to point 69, charging the lower side of each of capacitors 103 and 103' negatively with respect to the upper side. The junction point 151 of these two capacitors is connected to the positive side of the armature 11 and through the armature to the common terminal 18, whereas the unidirectional reference potential provided by the reference voltage tap 51 is also established with reference to the same common point 18. Accordingly, the cathode 38 of the upper auxiliary discharge tube 25 is made more positive with respect to its control grid 44, while the cathode 38' of the lower auxiliary discharge tube 25' is made more negative with respect to its control grid 44' at the same time. This causes a decrease in the current flow through the upper main discharge tube 21, and an increase in the current flow through the lower main discharge tube 21', thereby tending to balance the current flows through these two tubes. This feature of the invention is aptly termed "automatic balance," for the reason that, with this feature, the current flowing through the motor during successive half cycles of the alternating source tends to become automatically balanced. Manual balance of the full-wave circuit, that is, adjustment by hand to approach a condition in which the circuit will always remain in balance, is effected by properly choosing the resistors involved in controlling the current through each main discharge tube 20, 21' including resistors 71 and 71', respectively. If desired, resistors 71 and 71' can be in the form of potentiometers in order to afford manual adjustment of each side of the circuit.

It will be appreciated that the strings of resistors 71, 72, 31, and 32, or 71', 72', 31' and 32' on either side of the common junction point 149 provide many functions. As has been shown above, fine speed regulation is accomplished through these resistors and the limiter 80 functions through its connection to the junction point 75, 75' of these two resistor strings. As had just been pointed out, both manual and automatic balance of a full-wave circuit are also accompanied with the resistors of these two series strings.

Figure 8:
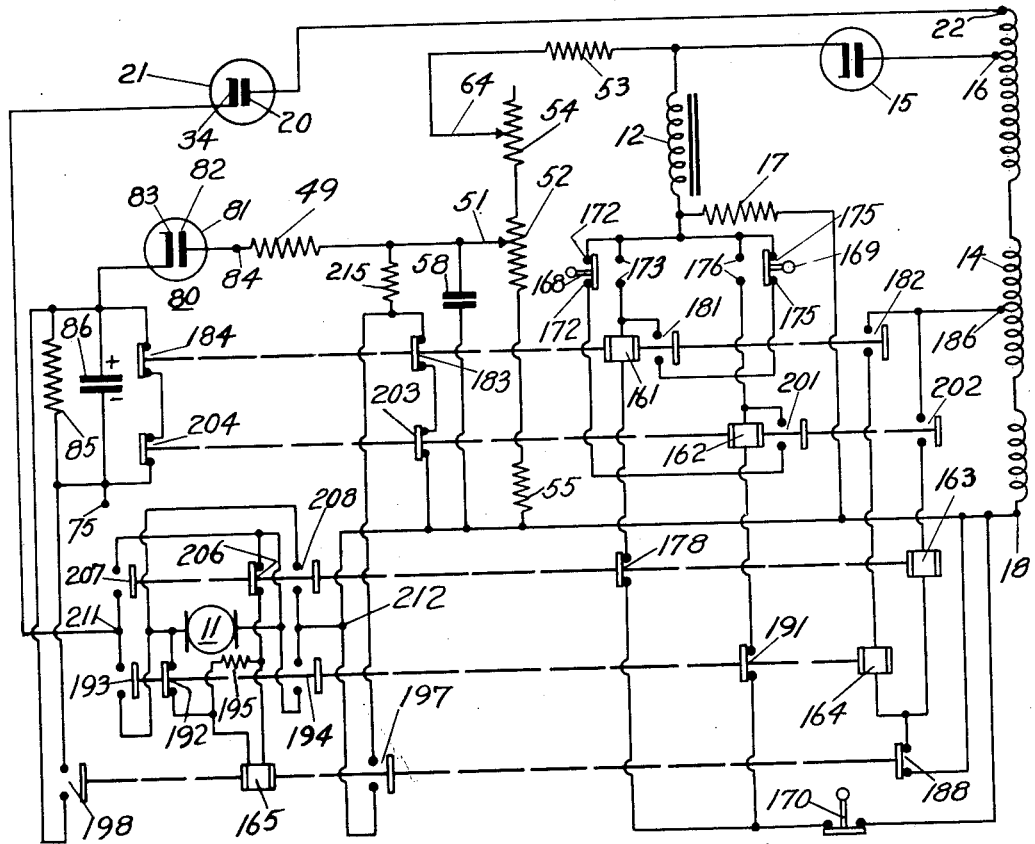
Fig. 8 is a circuit diagram of a start, stop, and reverse system which can be employed with the circuit of Fig. 1; and, Fig. 9 is a graph illustrating the character of the reversing operation of the circuit of Fig. 8.

The circuits of the present invention are readily adaptable to improved forms of braking and reversing, for example, as shown in Fig. 8. The braking and reversing control circuit of this figure advantageously combines dynamic braking for quickly reducing the speed of the armature from a high speed to a low speed, and reverse-current or tube-braking for completely stopping and reversing the motor. The circuit of Fig. 8 includes a system of low power initiating relays 161 and 162 for forward and reverse control, respectively, cooperating with heavier duty relays 164 and 163 controlled, respectively, thereby, together with a dynamic brake control relay 165. This circuit is illustrated as it would be applied to the speed control circuit of Fig. 1, and parts which are alike in both figures bear similar reference characters. Power for the initiating relays 161 and 162 is furnished through the field winding 12, being the voltage drop across the series field resistor 17, so that, if the field is lost due to an open-circuited field winding, or another cause, the motor will be stopped by operation of the various control circuits as will be described in detail below. Forward and reverse manually-operated push-button control switches 168 and 169, respectively, are arranged in circuit with a manually-operated, normally-closed push-button stop switch 170 across the series field resistor 17. The forward switch 168 has a pair of contacts 172 which are normally closed thereby, and a pair of normally-open contacts 173. The reverse switch 169 has a pair of normally-closed contacts 175 and a pair of normally-open contacts 176. The forward normally-open contacts 173 are in series with the forward initiating relay 161, and a normally-closed switch 178 which is operated to an open position by the reverse heavy-duty relay 163 when that relay is energized. The forward initiating relay 161 is provided with two normally-open switches 181 and 182 and two normally-closed switches 183 and 184, the condition of each of which it changes when energized, by moving each switch operator member to the left. When the forward pushbutton control switch 168 is pushed to the right to close the normally-open contacts 173 thereof, the forward initiating relay 161 is energized, closing its normally-open switch 181 which provides a holding circuit around the forward normally-open contacts 173 through the reverse normally-closed contacts 175. Thus, momentary operation of the forward push-button control switch 168 energizes the forward initiating relay 161, closing also the remaining normally-open switch 182 thereof and opening the normally-closed switches 183 and 184 thereof. Normally-closed switch 183 is part of a first shorting circuit including in series therewith a normally-closed switch 203 of the reverse initiating relay 162, which reduces the reference voltage at the reference voltage tap 51 of the speed control potentiometer 52 to the value of the common terminal 18, so that the motor cannot turn when this shorting circuit is closed. The first shorting circuit is connected in parallel with condenser 58, and includes a resistor 215 in series with the switches 183 and 203. Normally-closed switch 184 is part of a second shorting circuit including in series therewith a normally-closed switch 204 of the reverse initiating relay, which reduces the bias of the cathode 83 of the limiter 80 to so low a value that the motor cannot turn. The second shorting circuit is connected across the resistor 85 in the limiter diode fixed bias circuit. With the normally-closed switches 183 and 184 both open, the motor can be operated. The normally-open switch 182 being now closed, the forward heavy-duty relay 164 is energized by the voltage between a terminal 186 on the autotransformer 14 and the common terminal 18 thereof through a normally-closed switch 188 of the dynamic braking relay 165.

The forward heavy-duty relay 164 is provided with a first normally-closed switch 191, a second normally-closed switch 192 and two normally-open switches 193 and 194, the condition of each of which it changes when energized by moving the operator thereof to the left. The first normally-closed switch 191 is in series with the reverse initiating relay 162, and when opened interrupts the circuit of this relay so that it cannot be accidentally energized. The second normally-closed switch 192 is in series with the dynamic braking relay 165 across the armature 11 and, when opened, prevents this relay from being operated. A dynamic braking resistor 195 is in parallel with the dynamic braking relay 165. The two normally-open switches 193 and 194 are arranged in series with the armature 11, one on each side thereof, in its circuit from the high voltage point 22 of the autotransformer 14 through the discharge tube 21 to the common terminal 18. When the normally-open switches 193 and 194 are closed, current flows through the armature 11 from left to right in Fig. 8.

The starting circuit for causing the motor to operate in a forward direction has just been traced. The motor can be stopped by operating the stop switch 170 to an open circuit position whereupon the circuit of the forward initiating relay 161 is interrupted. This closes the normally-closed switches 183 and 184 of the forward initiating relay, so that the electronic control circuit of Fig. 1 is in a condition to stop the motor. The normally-open switches 181 and 182 are opened, removing the holding circuit around the forward control switch 168 and opening the energizing circuit of the forward heavy-duty relay 164. As a result, the normally-closed switches 191 and 192 are closed and immediately the armature 11 furnishes current to the dynamic braking resistor 195 and to the dynamic braking relay 165 in parallel. The dynamic braking relay is provided with first and second normally-open switches 197 and 198 in addition to the normally-closed switch 188, the condition of each of which it changes when energized by moving the operator thereof to the left. When the motor speed is of sufficient magnitude to operate the dynamic braking relay, the normally open switches 197 and 198 are closed, providing additional short circuiting paths in parallel with the aforementioned first and second shorting circuits, respectively, between the reference voltage tap 51 and the common terminal 18 and across the limiter bias resistor 85, respectively. Opening of the normally-closed switch 188 of the dynamic braking relay 165 furnishes additional interruption of the circuits of both the heavy-duty relays 163 and 164. As is well known, the dynamic braking voltage furnished by the rotating armature across dynamic braking resistor 195 decays exponentially. When the speed of the armature 11 drops to a value so low that the voltage provided thereby across the dynamic braking resistor 195 is below a certain critical value, the relay 165 falls out, and the switches 188 and 197 and 198 thereof assume their normal conditions, and the motor coasts to a stop.

The motor may be reversed as well as stopped by a single operation. Assuming the motor to be in a forward rotating condition, consider the sequence of events that occurs when the reverse control switch 169 is operated rather than the stop switch 170. To reverse the motor, the reverse switch 169 is pushed to the left in Fig. 8, whereupon the normally-closed contacts 175 thereof are immediately opened, interrupting the holding circuit of the forward initiating relay 161. The effect of this operation is the same as the effect of opening the stop switch 170. Continued operation of the reverse switch 169 to the left closes the normally-open contacts 176 thereof, causing current to flow through the reverse initiating relay 162, which operates the normally-open switches 201 and 202 thereof to the left to closed positions and the normally-closed switches 203 and 204 thereof to the left to open positions. The first normally-open switch 201 of the reverse initiating relay is in circuit with the normally-closed contacts 172 of the forward control switch 168, and, when this switch is closed, a holding circuit is provided for the reverse initiating relay 162 in parallel with the normally-open contacts 176 of the reverse control switch 169. The second normally-open switch 202 of the reverse initiating relay 162 is arranged in series with the reverse heavy-duty relay 163 across the heavy-duty relay voltage source, namely, the portion of the autotransformer 14 between points 186 and 18 thereof, again in series with the normally-closed switch 188 of the dynamic braking relay 165. The reverse heavy-duty relay 163 is provided with the aforementioned normally-closed switch 178 in the circuit of the forward initiating relay 161, and a second normally-closed switch 206 which is in series with the dynamic braking relay 165 and the dynamic braking resistor 195 across the armature 11, together with first and second normally-open switches 207 and 208, the condition of each of which it changes when energized by moving the operator means thereof to the left. The normally-open switches 207 and 208 are arranged in series with the armature 11, and when closed provide current therethrough from right to left in Fig. 8 from the high-voltage terminal 22 of the autotransformer 14 through the main discharge tube 21 and to the common terminal 18. The circuits through the normally-open switches 192 and 194 of the forward heavy-duty relay 164 and through the normally-open switches 207 and 208 of the reverse heavy-duty relay 163 are in parallel between points 211 and 212 in the armature circuit. The function of the normally-closed switch 173 is to prevent energization of the forward initiating relay 161 during the time that the motor is being operated in the reverse direction.

Thus, when the reverse push-button control switch 169 is operated to reverse the motor from a forward running condition, the motor is first operated to a stop condition, wherein the dynamic braking resistor 195 reduces its speed and the dynamic braking relay 165 provides shunt paths which reduce the speed control reference voltage to zero and the limiter bias to a point where little or no current can flow through the armature 11, as well as simultaneously opening the power circuits of both the heavy-duty relays 163 and 164. At the same time, a holding circuit is established for the reverse initiating relay 162 by the closing of the first normally-open switch 201 thereof, while the closing of the second normally-open switch 202 thereof disposes the reverse heavy-duty relay to be operated as soon as the dynamic braking relay 165 falls out and closes the normally-closed switch 188 thereof. The dynamic brake relay falls out at a prescribed value of armature voltage at which value it is safe and expedient to apply reverse current through the armature 11 by means of the main discharge tube 21. At this time, the normally-open switches 197 and 198 of the dynamic braking relay 165 are opened so that the electronic control circuit of Fig. 1 can again establish the ultimate speed of the motor.

Figure 9:
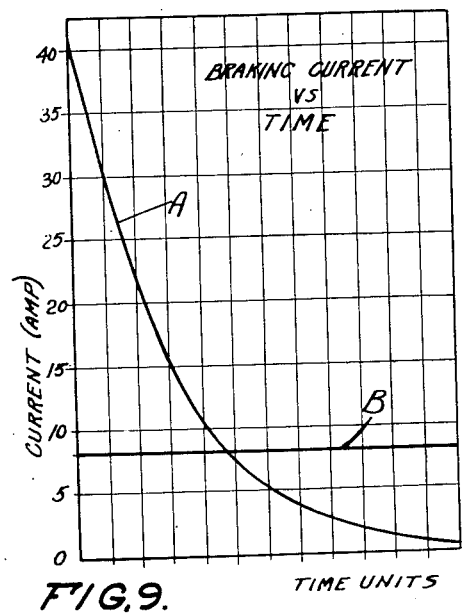

Referring now to Fig. 9, this is a graph illustrating the characteristics of dynamic braking and reverse-current braking with two curves A and B, respectively. Curve A in Fig. 9 illustrates that the braking current versus time of a typical motor decays exponentially, being initially quite large, for example, 40 amperes for 200 volts applied across the armature, and quite small after an elapsed time. Curve B illustrates that tube braking is of a nature to furnish substantially constant current. The larger current of dynamic braking is desirable at the start, and the constant current of tube braking is desirable when the dynamic braking current has fallen below the tube constant current value. The dynamic braking relay 165 of Fig. 8 is arranged to fall out and permit the reversing current to flow through the armature 11 when the dynamic braking current falls below the tube-braking current level or very soon thereafter. Thus, the reversing circuit of the present invention advantageously combines, in a circuit which can be operated by one motion, the desirable characteristics of both dynamic and reverse current or tube braking. The result is the ability to smoothly slow down, stop and reverse an electric motor of a large size in a minimum of elapsed time and with no noticeable chatter and vibration. The circuit of Fig. 8 is eminently suited for use with the speed control circuit of Fig. 1.

Many variations and modifications of the invention will occur to those who are skilled in the art to which the invention relates, and it is accordingly intended that the claims that shall follow shall not be limited, but only illustrated, by the details of the various embodiments of the invention shown and described herein.

What is claimed is:

1. In combination with an electric motor having an armature and a field winding, a system for operating said motor from a periodic voltage supply comprising input terminals adapted to be connected to a periodic voltage supply, a grid-controlled gaseous rectifier connected in series with said armature across said terminals, a relaxation oscillator circuit dimensioned to provide a relatively sharp voltage pulse of shorter period than that of said supply during each period of said supply, means providing control of the point in said supply period when said pulse occurs, and circuit means furnishing said pulse to the control grid of said rectifier.

2. In combination with an electric motor having an armature and a field winding, a system for operating said motor from a periodic voltage supply comprising input terminals adapted to be connected to a periodic voltage supply, a first grid-controlled gaseous discharge tube having a cathode connected to a first side of said armature and an anode connected to a first of said terminals, the second side of said armature being connected to the second of said terminals, means providing a source of unidirectional voltage connected at one point to a point of said supply, a second grid-controlled gaseous discharge tube having its anode connected to the positive side of said unidirectional source and its cathode connected to said first side of said armature, resistance means in each of said connections, a charging capacitor connected between said second tube anode and a point in said second tube cathode connection, a pulse transmissive connection between said second tube cathode and said first tube control grid, said second tube resistances and said charging capacitor being dimensioned so that when said second tube is rendered conductive relaxation oscillations occur at a period shorter than that of said supply, and means for rendering said second tube conductive at a prescribed point in said supply period.

3. In combination with an electric motor having an armature and a field winding, a system for operating said motor from a periodic voltage supply comprising input terminals adapted to be connected to a periodic voltage supply, a grid-controlled gaseous rectifier in series with said armature across said terminals, a grid-controlled relaxation oscillator circuit dimensioned to provide a voltage pulse when the grid potential thereof is raised above a prescribed firing potential from a lower potential, means coupling the output of said circuit to the grid of said rectifier, means providing a firing potential to said circuit, a voltage limiter including an anode-cathode electron tube path connected to short circuit said firing potential via said armature.

4. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled relaxation oscillator circuit dimensioned to provide a voltage pulse when the grid potential thereof is raised above a prescribed firing potential from a lower potential, means coupling the output of said circuit to the grid of said tube, means adapted to provide firing potential connected at one point to one of said terminals and an electron tube voltage limiter including an anode connected to said last-mentioned means and a cathode connected to the cathode of said tube.

5. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled relaxation oscillator circuit dimensioned to provide a voltage pulse when the grid potential thereof is raised above a prescribed firing potential from a lower potential, means coupling the output of said circuit to the grid of said tube, means adapted to provide variable unidirectional potential connected at one side to the armature supply terminal, and means adapted to provide periodic voltage of the same period as said supply but substantially one-quarter period lagging in phase connected in series with said unidirectional potential means to said oscillator grid.

6. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled relaxation oscillator circuit dimensioned to provide a voltage pulse when the grid potential thereof is raised above a prescribed firing potential from a lower potential, means coupling the output of said circuit to the grid of said tube, means adapted to provide variable unidirectional potential connected at one side to the armature supply terminal, and means adapted to provide periodic voltage of the same period as said supply but substantially one-quarter period lagging in phase connected in series with said unidirectional potential means to said oscillator grid, and an electron tube voltage limiter including an anode connected to said oscillator grid and a cathode connected to the cathode of said tube.

7. In combination with an electric motor having an armature and a field winding, a system for operating said motor from a periodic voltage supply comprising input terminals adapted to be connected to a periodic voltage supply, a first grid-controlled gaseous discharge tube having its anode-cathode path connected in series with said armature between said terminals with its cathode connected to one side of said armature, a second grid-controlled gaseous discharge tube connected in a relaxation oscillator circuit with its cathode connected to the first tube cathode through resistance means and coupled to the first tube control grid, means adapted to provide unidirectional potential connected at the positive side to the anode of said second tube and at the negative side to one of said terminals, means adapted to provide variable unidirectional potential connected at one side to the second tube control grid and at the other side to one of said terminals, and means adapted to provide periodic voltage of like period to said supply and one-quarter period retarded in phase with respect thereto connected in series with said variable potential means and the second tube grid.

8. In combination with an electric motor having an armature and a field winding, a system for operating said motor from a periodic voltage supply comprising input terminals adapted to be connected to a periodic voltage supply, a first grid-controlled gaseous discharge tube having its anode-cathode path connected in series with said armature between said terminals with its cathode connected to one side of said armature, a second grid-controlled gaseous discharge tube connected in a relaxation oscillator circuit with its cathode connected to the first tube cathode through resistance means and coupled to the first tube control grid, means adapted to provide unidirectional potential connected at the positive side to the anode of said second tube and at the negative side to one of said terminals, means adapted to provide periodic voltage of like period and phase to said supply connected in series in the connection to said second tube anode, means adapted to provide variable unidirectional potential connected at one side to the second tube control grid and at the other side to one of said terminals, and means adapted to provide periodic voltage of like period to said supply and one-quarter period retarded in phase with respect thereto connected in series with said variable potential means and the second tube grid.

9. In combination with an electric motor having an armature and a field winding, a system for operating said motor from a periodic voltage supply comprising input terminals adapted to be connected to a periodic voltage supply, a first grid-controlled gaseous discharge tube having its anode-cathode path connected in series with said armature between said terminals with its cathode connected to one side of said armature, a second grid-controlled gaseous discharge tube connected in a relaxation oscillator circuit with its cathode connected to the first tube cathode through resistance means and coupled to the first tube control grid, means adapted to provide unidirectional potential connected at the positive side to the anode of said second tube and at the negative side to one of said terminals, means adapted to provide variable unidirectional potential connected at one side to the second tube control grid and at the other side to one of said terminals, and means adapted to provide periodic voltage of like period to said supply and one-quarter period retarded in phase with respect thereto connected in series with said variable potential means and the second tube grid, and an electron tube voltage limiter including an anode connected to said second tube control grid and a cathode connected to the positive voltage side of said armature.

10. In combination with an electric motor having an armature and a field winding a system for operating said motor from a periodic voltage supply comprising input terminals adapted to be connected to a periodic voltage supply, a first grid-controlled gaseous discharge tube having its anode connected to a first of said terminals, said armature being connected between the second of said terminals and the cathode of said first tube, a second grid-controlled gaseous discharge tube connected in a relaxation oscillator circuit with its cathode resistively connected to the first tube cathode and nonconductively coupled to the first tube control grid, means adapted to provide unidirectional potential connected at the positive side to the anode of said second tube and at the other side to said second terminal, means adapted to provide variable unidirectional potential connected at one side to one of said terminals and at the other side to the second tube control grid, and means adapted to provide periodic voltage of like period to said supply and one-quarter period retarded in phase with respect thereto connected in series with said variable potential means and the second tube grid.

11. In combination with an electric motor having an armature and a field winding, a system for operating said motor from a periodic voltage supply comprising input terminals adapted to be connected to a periodic voltage supply, a first grid-controlled gaseous discharge tube having its anode connected to a first of said terminals, said armature being connected between the second of said terminals and the cathode of said first tube, a second grid-controlled gaseous discharge tube connected in a relaxation oscillator circuit with its cathode resistively connected to the first tube cathode and nonconductively coupled to the first tube control grid, means adapted to provide unidirectional potential connected at the positive side to the anode of said second tube and at the other side to said second terminal, means adapted to provide variable unidirectional potential connected at one side to one of said terminals and at the other side to the second tube control grid, and means adapted to provide periodic voltage of like period to said supply and one-quarter period retarded in phase with respect thereto connected in series with said variable potential means and the second tube grid, and an electron tube voltage limiter including an anode connected to said second tube control grid and a cathode connected to said first tube cathode.

12. In combination with an electric motor having an armature and a field winding, a system for operating said motor from a periodic voltage supply comprising input terminals adapted to be connected to a periodic voltage supply, full-wave rectifier means arranged in two separate circuits with said armature, separate control means for each of said circuits arranged to control the current flow in each circuit through the medium of first and second resistors, one for each of said circuits, wherein control voltages are arranged to appear, means applying a voltage across the first of said resistors which is proportional in magnitude to the current in one of said circuits, means applying a voltage across the second of said resistors which is proportional in magnitude to the current in the other of said rectifier paths, a common connection point between an end of each of said resistors and an electrically neutral point common to both of said circuits, a conductive connection between the remaining ends of said resistors, and means employing voltages developed in said networks by reason of current flow through said conductive connection to control the balance of current flow in said two circuits.

13. In a full-wave rectifier system having the armature of an electric motor in the load thereof, control means for regulating the current passing in each rectifier path of the system including first and second similar resistors each connected at one end to the same side of said armature, wherein control voltages are developed, means applying a voltage across said first resistor which is proportional in magnitude to the current in one of said rectifier paths, means applying a voltage across said second resistor which is proportional in magnitude to the current in the other of said rectifier paths, and a conductive connection between electrically similar remote points on both of said resistors, whereby the existence of a voltage difference between said remote points causes an unbalance current to flow in said resistors between said remote points, and means employing the voltages developed in each resistor by such unbalance current to reduce said voltage difference.

14. In a full-wave rectifier system having the armature of an electric motor in the load thereof, control means for regulating the current passing in each rectifier path of the system including first and second similar resistors each connected at one end to the same side of said armature, wherein control voltages are developed, means applying a voltage across said first resistor which is proportional in magnitude to the current in one of said rectifier paths, means applying a voltage across said second resistor which is proportional in magnitude to the current in the other of said rectifier paths, and a conductive connection between electrically similar remote points on both of said resistors, whereby the existence of a voltage difference between said remote points causes an unbalance current to flow in said resistors between said remote points, means employing the voltages developed in each resistor by such unbalance current to reduce said voltage difference, and means connected to said conductive connection for applying speed-controlling voltages to both of said paths simultaneously.

15. In a full-wave rectifier system having the armature of an electric motor in the load thereof, control means for regulating the current passing in each rectifier path of the system including first and second similar resistors each connected at one end to the same side of said armature, wherein control voltages are developed, means applying a voltage across said first resistor which is proportional in magnitude to the current in one of said rectifier paths, means applying a voltage across said second resistor which is proportional in magnitude to the current in the other of said rectifier paths, and a conductive connection between electrically similar remote points on both of said resistors, whereby the existence of a voltage difference between said remote points causes an unbalance current to flow in said resistors between said remote points, means employing the voltages developed in each resistor by such unbalance current to reduce said voltage difference, means connected to said conductive connection for applying speed-controlling voltages to both of said paths simultaneously, and an electron tube voltage limiter including an anode-cathode path connecting said speed-controlling voltage means across said armature.

16. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof.

17. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, said auxiliary relay means being connected each in series with the field winding of said motor.

18. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, a dynamic braking resistor arranged to be connected in parallel with said armature, first and second normally-closed brake control switches arranged in series with said resistor, said first switch being maintained open by said forward main relay during completion of said forward armature circuit and said second switch being maintained open by said reverse main relay during completion of said reverse armature circuit.

19. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, a dynamic braking resistor arranged to be connected in parallel with said armature, first and second normally-closed brake control switches arranged in series with said resistor, said first switch being maintained open by said forward main relay during completion of said forward armature circuit and said second switch being maintained open by said reverse main relay during completion of said reverse armature circuit, a dynamic brake relay connected in parallel with said resistor, a normally-closed main relay switch in series with both of said main relay means, said brake relay being arranged to open said main relay switch when the voltage across said resistor is above a prescribed value, and to close said switch when said voltage falls below said prescribed value, said prescribed value being below the limiting value above which reverse current cannot be safely passed through said armature.

20. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, first and second normally-closed safety switches in series with said forward and reverse auxiliary relay means, respectively, said first safety switch being arranged to be opened by said reverse main relay means during completion of said reverse armature circuit, and said second safety switch being arranged to be opened by said forward main relay means during completion of said forward armature circuit.

21. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, electronic control means for said motor, said control means being provided with disabling circuit means, and switch means controlled by each of said auxiliary relay means for interrupting said disabling circuit means during operation of either auxiliary relay means.

22. In an electric motor circuit a first set of main switch means arranged to make and break a forward circuit through the armature of the motor, a second set of main switch means arranged to make and break a reverse circuit through said armature, forward and reverse main relay means arranged to operate said first and second sets of switch means, respectively, power terminals adapted to be connected to a source of voltage, to which said main relay means are connected, forward and reverse normally-open auxiliary switches in the power circuits of said forward and reverse main relay means, respectively, forward and reverse auxiliary relay means adapted to close said forward and reverse auxiliary switches, respectively, when operated, forward and reverse control switches each having a set of normally-open and a set of normally-closed switch contacts, and having its set of normally-open contacts in an operator circuit for the forward and reverse auxiliary relays, respectively, and its set of normally-closed contacts in a holding circuit for the reverse and forward auxiliary relays, respectively, and normally-open holding switch means operated by each auxiliary relay arranged to complete the holding circuit thereof, a dynamic braking resistor arranged to be connected in parallel with said armature, first and second normally-closed brake control switches arranged in series with said resistor, said first switch being maintained open by said forward main relay during completion of said forward armature circuit and said second switch being maintained open by said reverse main relay during completion of said reverse armature circuit, electronic control means for said motor, said control means being provided with first and second parallel connected disabling circuits, said first circuit including normally-closed switch means arranged to be controlled by each of said auxiliary relay means for interrupting said first circuit during operation of either of said auxiliary relay means, said second circuit including normally-open switch means arranged to be controlled by said brake relay for closing said second circuit when said resistor voltage exceeds said prescribed value.

23. In a speed control circuit for an electric motor including controllable electron discharge means and means adapted to connect said discharge means and said motor in series to a source of alternating voltage, speed control means for said motor operable thereon through control of said discharge means, means providing a reference speed control voltage, means providing said control voltage to said speed control means, means arranged to short circuit said speed control voltage through the motor armature and thereby to limit the magnitude of said control voltage in accordance with the speed of said motor, means providing a voltage varying in magnitude in accordance with the current flow through said discharge means, and means arranged to provide said last-mentioned voltage to said speed control means and to said limiting means simultaneously.

24. In a speed control circuit for an electric motor including controllable electron discharge means and means adapted to connect said discharge means and said motor in series to a source of alternating voltage, speed control means for said motor operable thereon through control of said discharge means, means providing a reference speed control voltage, means providing said control voltage to said speed control means, means arranged to short circuit said speed control voltage through the motor armature and thereby to limit the magnitude of said control voltage in accordance with the speed of said motor, means providing a voltage varying in magnitude in accordance with the current flow through said discharge means, means arranged to provide a fraction of said last-mentioned voltage to said speed control means in a sense to enhance a rate of change of current flow in said main discharge means, and means arranged to provide a fraction of said last-mentioned voltage to said limiting means in a sense to reduce said rate of change.

25. In a speed control circuit for an electric motor, gaseous discharge means having an anode and a cathode, a motor armature connected at one side to said cathode, means adapted to connect said discharge means and armture in series to a source of alternating voltage, speed control means adapted to govern said discharge means, a transformer having its primary winding in series between said anode and said connection means and impedance and rectifier means in series with its secondary winding, means including said impedance means in part in a regulation circuit for said speed control means, a source of speed control reference voltage, means arranged to apply said reference voltage to said speed control means, a limiter circuit arranged to short circuit said speed control voltage through said armature and thereby to limit the magnitude of said reference voltage to a prescribed safe value in accordance with the speed of said armature, and means including said impedance means in a regulation circuit for said limiter circuit.

26. In a speed control circuit for an electric motor including controllable electron discharge means and means adapted to connect said discharge means and said motor in series to a source of alternating voltage, speed control means for said motor operable thereon through control of said discharge means, means providing a reference speed control voltage, means providing said control voltage to said speed control means, means arranged to short circuit said speed control voltage through the motor armature and a resistance path in series and thereby to limit the magnitude of said control voltage in accordance with the speed of said motor, means providing a voltage varying in magnitude in accordance with the current flow through said discharge means, and means arranged to provide said last-mentioned voltage to said speed control means and simultaneously across at least a portion of said resistance path.

27. In combination with an electric motor having an armature and a field winding, a system for operating said motor from a periodic voltage supply comprising input terminals adapted to be connected to a periodic voltage supply, a grid-controlled gaseous rectifier connected in series with said armature across said terminals, an electric wave producing circuit dimensioned to provide a voltage pulse characterized by a relatively steep leading edge during each period of said supply, means providing control of the point in said supply period when said leading edge occurs, and circuit means furnishing said pulse to the control grid of said rectifier.

28. In combination with an electric motor having an armature and a field winding, a system for operating said motor from a periodic voltage supply comprising input terminals adapted to be connected to a periodic voltage supply, a grid-controlled gaseous rectifier connected in series with said armature across said terminals, an electronic pulse producing oscillator circuit dimensioned to provide a voltage pulse characterized by a relatively steep leading edge during each period of said supply, means providing control of the point in said supply period when said leading edge occurs, and circuit means furnishing said pulse to the control grid of said rectifier.

29. In combination with an electric motor having an armature and a field winding, a system for operating said motor from a periodic voltage supply comprising input terminals adapted to be connected to a periodic voltage supply, a first grid-controlled gaseous discharge tube having a cathode connected to a first side of said armature and an anode connected to a first of said terminals, the second side of said armature being connected to the second of said terminals, means providing a source of unidirectional voltage connected at one point to a point of said supply, a second grid-controlled gaseous discharge tube having its anode connected to the positive side of said unidirectional source and its cathode connected to said first side of said armature, resistance means in each of said connections, said second tube being arranged in an electric pulse producing circuit to produce a voltage pulse characterized by a relatively sharp leading edge, means to cause said second tube to produce said pulse at a prescribed point in said supply period, and a pulse transmissive connection between said second tube and said first tube control grid.

30. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled pulse producing oscillator circuit dimensioned to provide a voltage pulse characterized by a relatively steep leading edge, means coupling the output of said circuit to the grid of said tube, means connected at one point to one of said terminals and adapted to provide control voltage to the grid of said oscillator and an electron tube voltage limiter including an anode connected to said means and a cathode connected to the cathode of said tube.

31. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled oscillator circuit dimensioned to provide a voltage pulse when the grid potential thereof is raised above a prescribed firing potential from a lower potential, means coupling the output of said circuit to the grid of said tube, means adapted to provide variable unidirectional potential connected at one side to the armature supply terminal, and means adapted to provide periodic voltage of the same period as said supply but substantially one-quarter period lagging in phase connected in series with said unidirectional potential means to said oscillator grid.

32. In combination with an electric motor having an armature and a field winding, a system for operating said motor from a periodic voltage supply comprising input terminals adapted to be connected to a periodic voltage supply, a grid-controlled gaseous discharge tube having its anode-cathode path connected in series with said armature between said terminals with its cathode connected to one side of said armature, a grid-controlled oscillator circuit dimensioned to provide a voltage pulse when the grid potential thereof is raised above a prescribed firing potential from a lower potential, means coupling the output of said circuit to the grid of said tube, means adapted to provide variable unidirectional potential connected at one side to the armature supply terminal, and means adapted to provide periodic voltage of the same period as said supply but substantially one-quarter period lagging in phase connected in series with said unidirectional potential means to said oscillator grid, and an electron tube voltage limiter including an anode connected to said oscillator grid and a cathode connected to the cathode of said tube.

CARLO L. CALOSI.

References Cited in the file of this patent

UNITED STATES PATENTS

| Number | Name | Date |
| --- | --- | --- |
| 2,229,414 | King | Jan. 21, 1941 |
| 2,400,599 | Reeves | May 21, 1946 |